United States Patent [19]

Gallo

[11] Patent Number: 6,115,648
[45] Date of Patent: Sep. 5, 2000

[54] SYSTEM AND METHOD FOR NON-INVASIVE ACCESSOR RECALIBRATION

[75] Inventor: Frank David Gallo, Tucson, Ariz.

[73] Assignee: International Business Machines Corporation, Armonk, N.Y.

[21] Appl. No.: 08/931,296

[22] Filed: Sep. 16, 1997

[51] Int. Cl.[7] .................................................. G06F 17/00
[52] U.S. Cl. .......................... 700/218; 700/214; 700/215
[58] Field of Search ........................ 364/478.06, 478.03, 364/478.02; 360/92; 369/34, 30; 700/218, 215, 214, 213, 216, 217

[56] References Cited

U.S. PATENT DOCUMENTS

| | | | |
|---|---|---|---|
| 4,986,664 | 1/1991 | Lovoi | 356/376 |
| 5,102,280 | 4/1992 | Podje et al. | 414/225 |
| 5,134,602 | 7/1992 | Baca et al. | 369/44.27 |
| 5,237,468 | 8/1993 | Ellis | 360/92 |
| 5,239,650 | 8/1993 | Hartung et al. | 395/650 |
| 5,287,459 | 2/1994 | Gniewek | 395/275 |
| 5,289,589 | 2/1994 | Bingham et al. | 395/425 |
| 5,323,327 | 6/1994 | Carmichael et al. | 364/478.06 |
| 5,332,352 | 7/1994 | Podjue et al. | 414/225 |
| 5,345,350 | 9/1994 | Ellis et al. | 360/92 |
| 5,386,516 | 1/1995 | Monahan et al. | 395/275 |
| 5,426,581 | 6/1995 | Kishi et al. | 364/478.02 |
| 5,513,156 | 4/1996 | Hanaoka et al. | 369/34 |
| 5,579,490 | 11/1996 | Dalziel et al. | 395/94 |
| 5,642,298 | 6/1997 | Mallory et al. | 364/561 |
| 5,729,464 | 3/1998 | Dimitri | 364/478.03 |
| 5,740,061 | 4/1998 | Dewey et al. | 364/478.02 |
| 5,761,503 | 6/1998 | Fisher | 711/170 |
| 5,818,723 | 10/1998 | Dimitri | 364/478.02 |
| 5,825,913 | 10/1998 | Rostami et al. | 382/151 |
| 5,864,833 | 1/1999 | Schaffer et al. | 706/13 |
| 5,915,915 | 6/1999 | Allen et al. | 414/744.1 |
| 5,984,619 | 11/1999 | Allen et al. | 414/752 |
| 6,038,029 | 3/2000 | Finarov | 356/399 |
| 6,038,490 | 3/2000 | Dimitri et al. | 700/214 |

*Primary Examiner*—Christopher P. Ellis
*Assistant Examiner*—Michael E. Butler
*Attorney, Agent, or Firm*—Gray Cary Ware Freidenrich

[57] ABSTRACT

Non-invasive recalibration is performed for an accessor in a data storage library. The library includes an accessor along with multiple targets such as fiducials, media storage cells, and one or more media drives. A storage unit contains stored coordinates aligning the accessor with the targets. One of the fiducials is predefined as a master fiducial. When recalibrating, the accessor is used to determine new master coordinates currently defining the master fiducial. A positional difference is derived between the new master coordinates and the stored coordinates of the master fiducial. Coordinate update values are determined for each cell and drive according to the positional difference. The coordinate update value of each target may be the derived positional difference, or the target's new coordinate. The coordinate update values are finally stored for use to position the accessor during subsequent operation of the library.

21 Claims, 3 Drawing Sheets

SYSTEM AND METHOD FOR NON-INVASIVE ACCESSOR RECALIBRATION

BACKGROUND OF THE INVENTION

1. Field of the Invention

The present invention relates to data storage libraries, which transport and access media items using media accessors. More particularly, the invention concerns an apparatus, method, and article of manufacture for non-invasive recalibration of an accessor in a data storage library.

2. Description of the Related Art

Data storage libraries are one of the most popular types of mass storage system today. Generally, a data storage library connotes a great number of co-located portable data storage media, transported by a robotic mechanism between locations such as storage cells, read/write media drives, and input/output facilities.

These libraries have become popular for many reasons. First, the portable data storage media, usually magnetic tape or optical media, are typically inexpensive relative to other storage formats such as magnetic disk drives. Furthermore, libraries are easily expanded to accommodate more data, simply by adding more items of media and storage cells. Additionally, most libraries can be easily updated with new equipment as it comes onto the market. For example, a new model tape drive may be introduced to the library to supplement or replace the existing drives.

A typical library includes an expandable protective structure, constructed of various doors and panels, to house the library's drives, storage cells, robotic device, and related electronic equipment. The robotic device, called an "accessor" includes appropriate mechanical and electrical subcomponents to move side-to-side, lengthwise, and up-down within the protective structure. Accessors also include features needed to grasp and release media items. Importantly, the library must also include an alignment system for the accessor. Such a system typically includes a light source aboard the accessor, and multiple light-absorbing or light-reflecting "fiducials" strategically located throughout the library.

To best use the fiducials, one or more are usually collocated with each removable component of the library, such as a drive or panel of storage cells. This way, the accessor can easily relocate a new, moved, or replaced component by finding its corresponding fiducial. The process of training the accessor's electronics to find and remember a fiducial's location is called "teaching" the accessor.

Besides the addition, movement, or replacement of library components, teaching is also necessary when the accessor itself is removed or adjusted; in this case, the accessor must be sequentially advanced to each fiducial's location. More particularly, when the accessor is removed or adjusted, at least one conventional teaching technique operates as follows.

For each fiducial, this technique retrieves the fiducial's position from a storage location. Then, the accessor moves to that fiducial and determines the fiducial's position, for example in an x-y coordinate system. A difference value is computed between this position and the same fiducial's previously stored position, and this difference value stored in association with each cell, drive, or other component whose position is linked to that fiducial. The entire process is repeated for each fiducial in the system. After the teaching ends, the accessor operates using the stored positions of the cells and drives as updated by their newly computed difference values.

Despite its usefulness and reliability, the foregoing teaching process still occurs at the expense of customer "jobs", since the library is taken offline to "teach" the accessor. In some libraries, reteaching the accessor can take as little as fifteen minutes to more than one hour, depending on the library's size. Furthermore, this downtime can be especially frustrating in systems utilizing a second accessor to improve media access time, because the second accessor still must be disabled during teaching of the first accessor.

Design engineers are frustrated by any unavailability of the library for customer jobs because such work is the underlying reason for the library in the first place. Plus, many applications can be especially intolerant of library "down-time". For example, continuous data availability is critical for telephone companies, stock brokerages, companies with twenty-four hour sales lines, companies providing information internationally to those in many different time zones, etc.

Consequently, certain libraries may not be completely adequate for some applications due to these conditions.

SUMMARY OF THE INVENTION

Broadly, the present invention concerns the non-invasive recalibration of an accessor in a data storage library. The library includes an accessor along with multiple targets such as fiducials, media storage cells, and one or more media drives. A storage unit contains stored coordinates aligning the accessor with the targets. One of the fiducials is predefined as a master fiducial.

The invention is used to recalibrate the accessor after it is adjusted, replaced, or added to the library, where the various targets have not moved. Recalibration begins by using the accessor to determine new master coordinates currently defining the master fiducial. A positional difference is derived between the new master coordinates and the stored coordinates of the master fiducial. Coordinate update values are determined for each cell and drive according to the positional difference. The coordinate update value of each target may be the derived positional difference, or the target's new coordinate. The coordinate update values are finally stored for use to position the accessor during subsequent operation of the library.

Accordingly, one embodiment of the invention may be implemented to provide a method to efficiently recalibrate an accessor in a data storage library. In another embodiment, the invention may be implemented to provide an apparatus useful for efficient recalibration of an accessor in a data storage library. In still another embodiment, the invention may be implemented to provide a signal-bearing medium tangibly embodying a program of machine-readable instructions executable by a digital data processing apparatus to perform a method for efficiently recalibrating an accessor in a data storage library.

The invention affords its users with a number of distinct advantages. First, the invention provides substantially faster accessor recalibration in cases where recalibration is needed due to removal or adjustment of the accessor. As a result, the library can proceed with customer jobs with less delay. Furthermore, in dual-accessor systems, the invention advantageously provides continuous availability for satisfying customer jobs by using a second accessor while a first accessor is being recalibrated. This is because an accessor can be recalibrated without withdrawing the accessor from a remote location such as a library garage, bay, or other location without any potential for collisions with the other accessor. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

Figure 1:
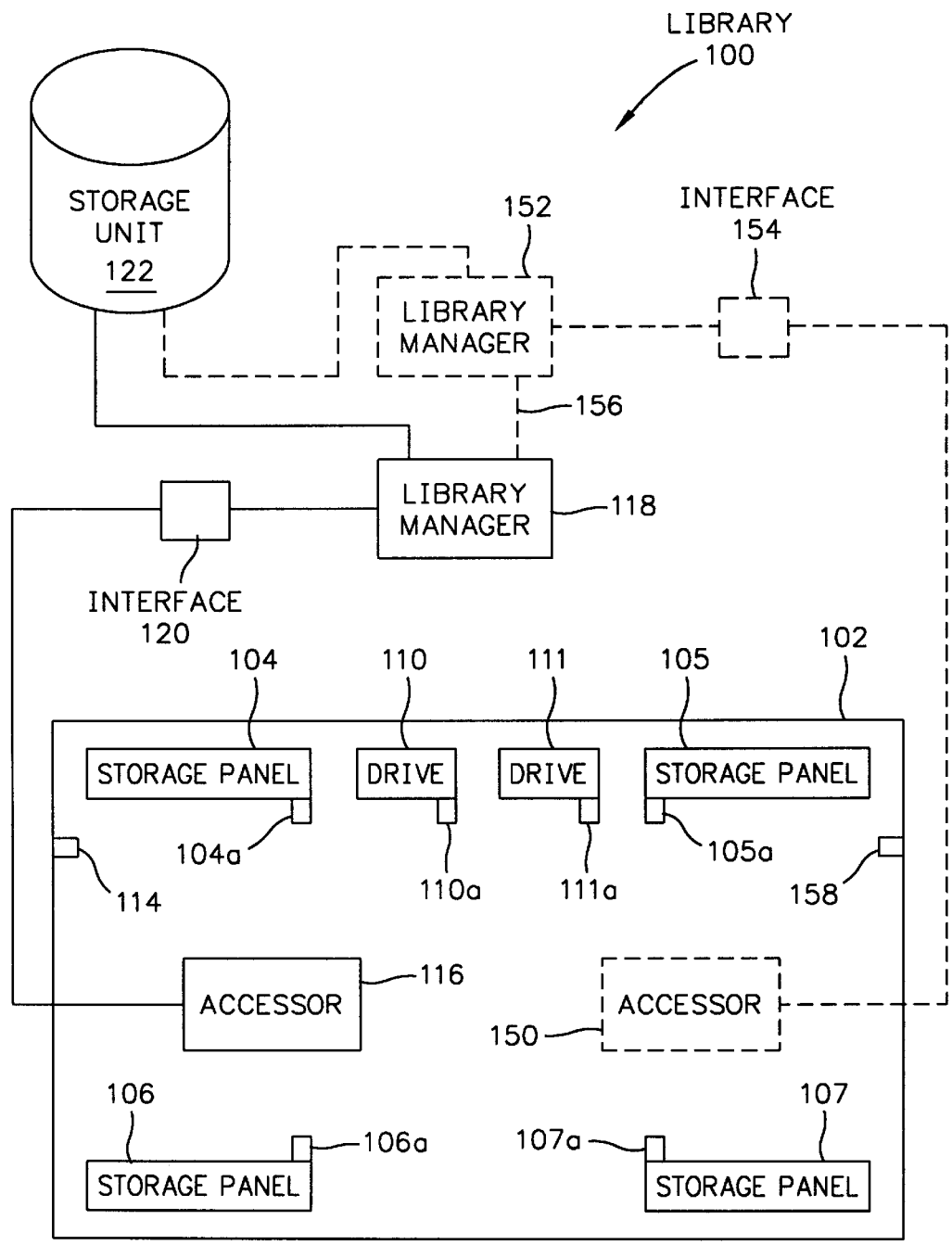
FIG. 1 is a block diagram of the hardware components and interconnections of a data storage library in accordance with the invention.

DETAILED DESCRIPTION OF THE PREFERRED EMBODIMENTS HARDWARE COMPONENTS & INTERCONNECTIONS

Data Storage Library

One aspect of the invention concerns an apparatus embodied by a data storage library. Such a library may be implemented by various hardware components and interconnections, as described by the library 100 of FIG. 1. The library 100 includes a protective structure 102, preferably made of various doors and panels to facilitate modification such as expansion. The structure 102 houses a number of storage panels 104–107, each panel including an array of multiple media storage cells. Each storage cell is sized appropriately to receive an item of removable media such as a magnetic tape, optical tape, DVD, CD-ROM, WORM, writable CD, or another storage media.

The structure 102 also houses one or more media drives, illustrated by the two drives 110–111. Each drive preferably comprises a mechanism for conducting read/write operations with an item of removable media, as mentioned above. When implementing the library 100 as a tape library, for example, the drives 110–110 may comprise IBM 3590 tape drives.

Preferably, each of the panels 104–107 and drives 110–111 is removable from the structure 102, for replacement, repair, etc. Thus, each of component is rigidly attached to a fiducial that has a fixed relationship with the component, even though the entire component-fiducial pair may be moved together. This way, the accessor (described below) can easily relocate a new, moved, or replaced component by finding its corresponding fiducial. For example, each component 104–107 and 110–111 includes a corresponding fiducial 104a–107a and 110a–111a. Additionally, if desired, another fiducial 114 may be provided, this fiducial being rigidly attached to the structure 102 apart from any removable component of the library 100.

In one embodiment, each fiducial may comprise a substantially flat, light-reflective, rectangular pad, as found in the IBM 3494 library. If desired, each such fiducial may be surrounded by a light-absorbent material to enhance the accuracy of precisely locating the fiducial. Alternatively, fiducials may comprise light-absorbent material surrounded by a light-reflective pad of a predetermined pattern. Ordinarily skilled artisans, with the benefit of this disclosure, will also recognize a variety of other fiducial implementations within the scope of this invention.

The library 100 also includes an accessor 116, which comprises a robotic device with appropriate mechanical and electrical subcomponents to move side-to-side, lengthwise, and up-down within the protective structure. The accessor 116 also includes features needed to grasp and release media items. The accessor 116 also includes an alignment system (not shown) for aligning its components with the drives 110–111, cells of the storage panels 104–107, and fiducials 104a–107a/110a–111a/114. Preferably, the accessor's alignment system includes a photoelectric light source and a photoelectric light sensor and aboard the accessor. The accessor may also include one or more laser devices (not shown) to read bar codes affixed to the media items, storage cells, and other locations. An illustrative example of a suitable accessor is the accessor of the IBM 3494 library.

The accessor 116 is coupled to a library manager 118 via an interface 120. The library manager 118 manages various operations of the library, including movement and configuration of the accessor 116. As an example, the library manager 118 may comprise a PENTIUM based IBM personal computer, or another suitable machine such as a workstation, microprocessor, mainframe computer, etc. The interface 120 preferably includes a servo controller card to relay analog signals to x-y positioning motors of the accessor 116, and a digital input/output card to supply various digital signals to the accessor 116.

In addition to the interface 120, the library manager 118 is coupled to storage unit 122. The storage unit 122 preferably comprises non-volatile memory such as one or more magnetic data storage disks such as a "hard drive", a tape drive, or any other suitable storage device. Among other data, the storage unit 122 contains data used by the library manager 118 in operating the accessor 116 to locate media items, load media items to the drives 110–111, and return media items to cells of the storage panels 104–107.

As an optional enhancement, the library 100 may also include a second accessor 150, coupled to a corresponding second library manager 152 via a second interface 154. The library manager 152, like the library manager 118, is also coupled to the storage unit 122. This permits the library managers 118/152 share the storage unit 122 in managing a common inventory of media items, and other shared features such as the drives 110–111. The library managers 118/152 are preferably interconnected by a redundant link 156, such as a pair of Ethernet links using TCP/IP protocol. For ease of explanation, features of the invention involving an accessor are discussed below in the context of the first accessor 116, since the hardware and operation of the second accessor 150 is substantially similar.

In the dual-accessor embodiment, the fiducial 114 is preferably located in a garage, bay, or other area where the accessor 116 can reside without any potential for collision with the second accessor 150. Similarly, the accessor 150 preferably has fiducial 158 of its own, rigidly attached to the structure 102 apart from any removable component of the library 100. It is also desirable to locate this fiducial 158 in a garage, bay, or other area where the accessor 150 can reside without any potential for collision with the first accessor 116.

Files in the Storage Unit

Coordinate System, Generally

Each of the storage cells, drives, and fiducials makes up a "target" in the library 100, and has a corresponding coordinate in a predefined coordinate system. When the library manager 118 provides the proper coordinate to the accessor 116, the accessor 116 moves into horizontal and vertical alignment with the corresponding target.

In the illustrated example, the coordinate system comprises an "x-y" coordinate system, with "x" and "y" values defining horizontal and vertical positions, respectively. Thus, when the library manager 118 provides a given x-y input coordinate to the accessor 116, the accessor 116 moves horizontally and vertically to a unique position defined by the x and y coordinates. With one of the fiducials 104a–107a, 110a–111a, 114, or 158, providing a specific x-y input coordinate to the accessor 116 moves the accessor 116 so that its light source aligns with that fiducial.

In order to efficiently operate the library 100, the storage unit 122 is used to store predefined coordinates for each target. With the benefit of this disclosure, ordinarily skilled artisans will recognize a variety of different storage methodologies for such coordinates. The following is one exemplary implementation, describing various files residing on the storage unit 122.

Resource File

A "resource file" is used to store manufacturer's nominal coordinates for each potential target of the library 100, irrespective of which components are actually installed. Thus, if the structure 102 can be filled with eight drives, sixteen storage panels, and twenty-six fiducials, the resource file contains nominal coordinates for each of these components. Clearly, and as discussed below, these coordinates must be updated to practically use the library 100. In this example, each coordinate includes x and y values, in hundredths of a millimeter.

An exemplary resource file is shown in Table 1, below.

TABLE 1

| | Resource File | |
|---|---|---|
| | MANUF COORDINATES | |
| ITEM | X | Y |
| FIDUCIAL #1 | 1210 | 800 |
| FIDUCIAL #2 | 1210 | 60400 |
| . | | |
| . | | |
| FIDUCIAL #3 | 36990 | 124650 |
| CELL #1 | 37700 | 62800 |
| CELL #2 | 37700 | 59600 |
| . | | |
| . | | |
| CELL #N | 500 | 2000 |
| DRIVE #1 | 4200 | −1510 |
| DRIVE #2 | −3585 | −2315 |
| . | | |
| . | | |
| DRIVE #N | 3585 | −2315 |

Database File

The storage unit 122 also includes a "database file", used to store coordinates of each cell and drive in the particular library 100, updated from the manufacturer's original specifications. An exemplary database file is shown in Table 2, below. For reasons explained below, the database file need not contain coordinates for any fiducials.

In this example, the database file includes "new teach" columns for x and y coordinates; these coordinates are obtained each time a "new teach" is performed, and serve to update the manufacturer's original coordinates. The new teach serves to replace the x-y values in the "new teach" columns of the database file. The "new teach" is performed when the user wishes to recreate the database file from scratch, e.g., at installation or after a catastrophic loss of the database file or storage unit.

In contrast to "new teach", the "standard teach" merely provides numbers representing how each target's new coordinates have changed with respect to the most recent "new teach". Thus, the "standard teach" column contains $\Delta_x$ and $\Delta_y$ values, representing a positional difference between each target's current coordinates and those of the latest new teach. Standard teach operations are useful when targets in the library have shifted over time, or when there has been a configuration change in the library, such as replacement, repair, or addition of components.

TABLE 2

| | Database File | | | |
|---|---|---|---|---|
| | NEW TEACH | | STANDARD TEACH | |
| ITEM | X | Y | $\Delta_X$ | $\Delta_Y$ |
| CELL #1 | 440789 | 55463 | 0 | 0 |
| CELL #2 | 440789 | 58663 | 0 | 0 |
| . | | | | |
| . | | | | |
| CELL #N | 1220 | 60400 | 500 | 200 |
| DRIVE #1 | 18010 | 22210 | 200 | −100 |
| DRIVE #2 | 23010 | 22210 | 0 | 0 |
| . | | | | |
| . | | | | |
| DRIVE #N | 45600 | 87010 | 100 | 0 |

System File

The storage unit 122 also contains a system file, which contains the coordinates of the master fiducials 114/158 from the latest "new teach". An exemplary system file is shown in Table 3, below. As explained below, the system file does not require any data concerning a positional difference between old and new master fiducial coordinates.

TABLE 3

| System File | |
|---|---|
| MASTER COORDINATES | |
| X | Y |
| 1240 | 797 |

Exemplary Digital Data Processing Apparatus

Another aspect of the invention concerns a digital data processing apparatus, provided to recalibrate the accessor 116. This apparatus may be embodied by various hardware components and interconnections, and is preferably implemented in the library manager 118.

Figure 2:
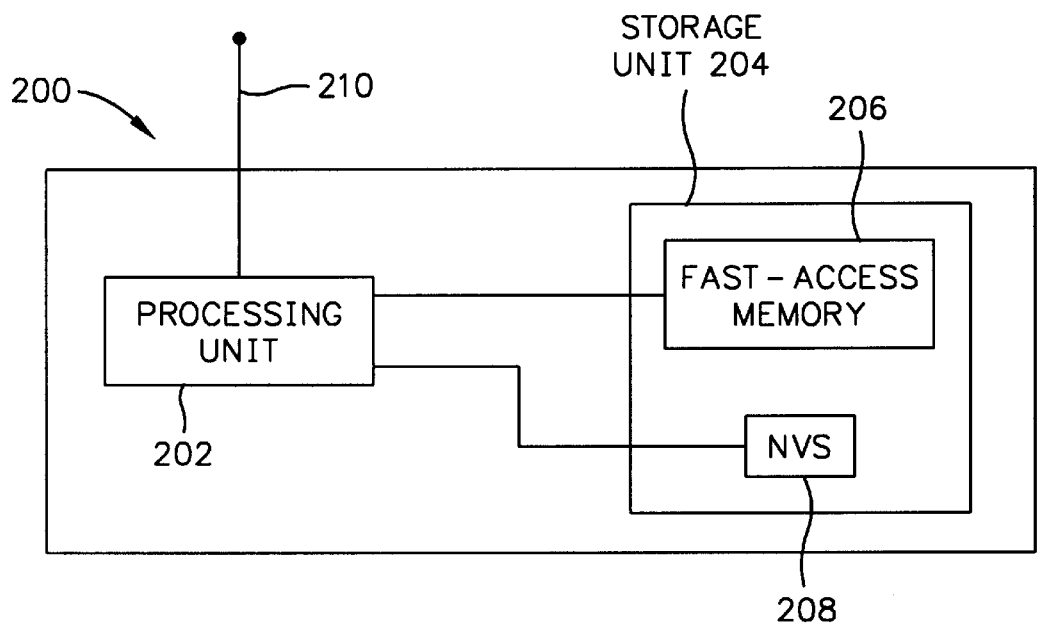
FIG. 2 is a block diagram of a digital data processing machine in accordance with the invention.

FIG. 2 shows a specific example of one digital data processing apparatus 200. The apparatus 200 includes a processing unit 202, such as a microprocessor or other processing machine, coupled to a storage unit 204. In the present example, the storage unit 204 includes a fast-access memory 206 and nonvolatile storage 208. The fast-access memory 206 preferably comprises random access memory, and may be used to store the programming instructions executed by the processing unit 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processing unit 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

OPERATION

In addition to the various hardware embodiments described above, a different aspect of the invention concerns a method for recalibrating an accessor in a data storage library.

Signal-Bearing Media

In the context of FIG. 1, such a method may be implemented, for example, by operating the library manager 118, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to recalibrate an accessor in a data storage library.

Figure 3:
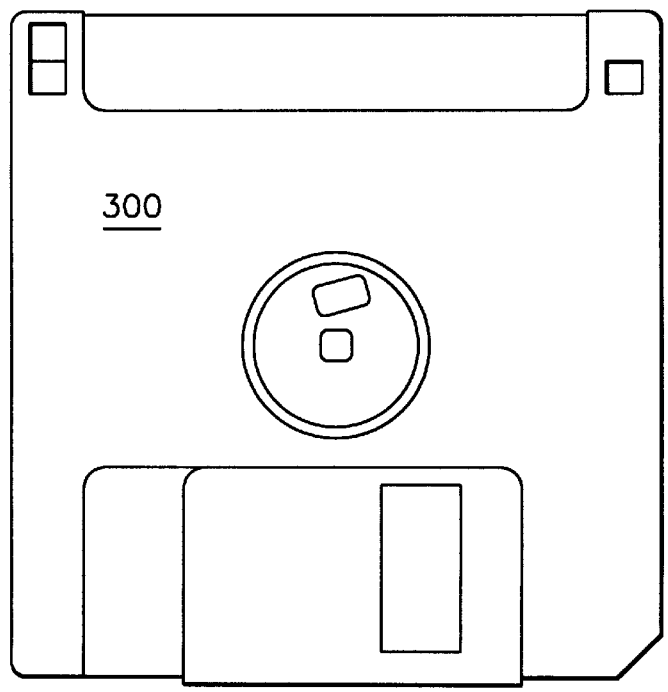
FIG. 3 is a plan view of an exemplary signal-bearing medium in accordance with the invention.

This signal-bearing media may comprise, for example, RAM (not shown) contained within the library manager 118, as represented by the fast-access storage 206. Alternatively, the instructions may be contained in another signal-bearing media, such as a magnetic data storage diskette 300 (FIG. 3), directly or indirectly accessible by the library manager 118. Whether contained in the library manager 118 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled "C" language code.

Operational Sequences

As explained above, the library 100 performs various teach operations to learn the locations of targets in the library 100. "New teach" and "standard teach" operations may be performed for one or all fiducials, depending upon the situation. Furthermore, as described below, the invention includes an accessor recalibration function that efficiently reorients the accessor 116 to the entire system when the accessor alone has been adjusted, removed, or otherwise positionally changed with respect to the structure 102.

New Teach

Each time a new teach is performed for a fiducial, the library manager 118 directs the accessor 116 to sequentially align itself with the fiducial and determine the fiducial's coordinates. Using these coordinates as a baseline, the library manager 118 then computes the x and y coordinates for each target associated with that fiducial, and stores these coordinates in the "new teach" columns of the database file. Also, the "standard teach" columns are zeroed.

When a new teach is performed for a master fiducial 114/158, the new x and y coordinates for the master fiducial 114/158 are simply stored in the system file.

Standard Teach

Each time a standard teach is performed for a fiducial, the library manager 118 directs the accessor 116 to sequentially align itself with the fiducial and determine the fiducial's coordinates. Using these coordinates, the library manager 118 then computes a positional difference between the fiducial's current coordinates and those of the last new teach (shown in the database file).

Then, using these coordinates as a baseline, the library manager 118 computes the positional differences ($\Delta_x$ and $\Delta_y$ values) between current and last "new teach" coordinates of each target associated with that fiducial, storing these positional differences in the "standard teach" columns of the database file. The "new teach" columns are untouched.

Accessor Recalibration In addition to the "new teach" and "standard teach" routines, the invention includes an accessor recalibration routine which is useful when the accessor alone has been adjusted, replaced, or otherwise positionally changed with respect to the fiducials and targets. As explained below, the routine serves to update the database file's positional differences ($\Delta_x$ and $\Delta_y$ values), and also to update the system file's master fiducial coordinates.

Figure 4:
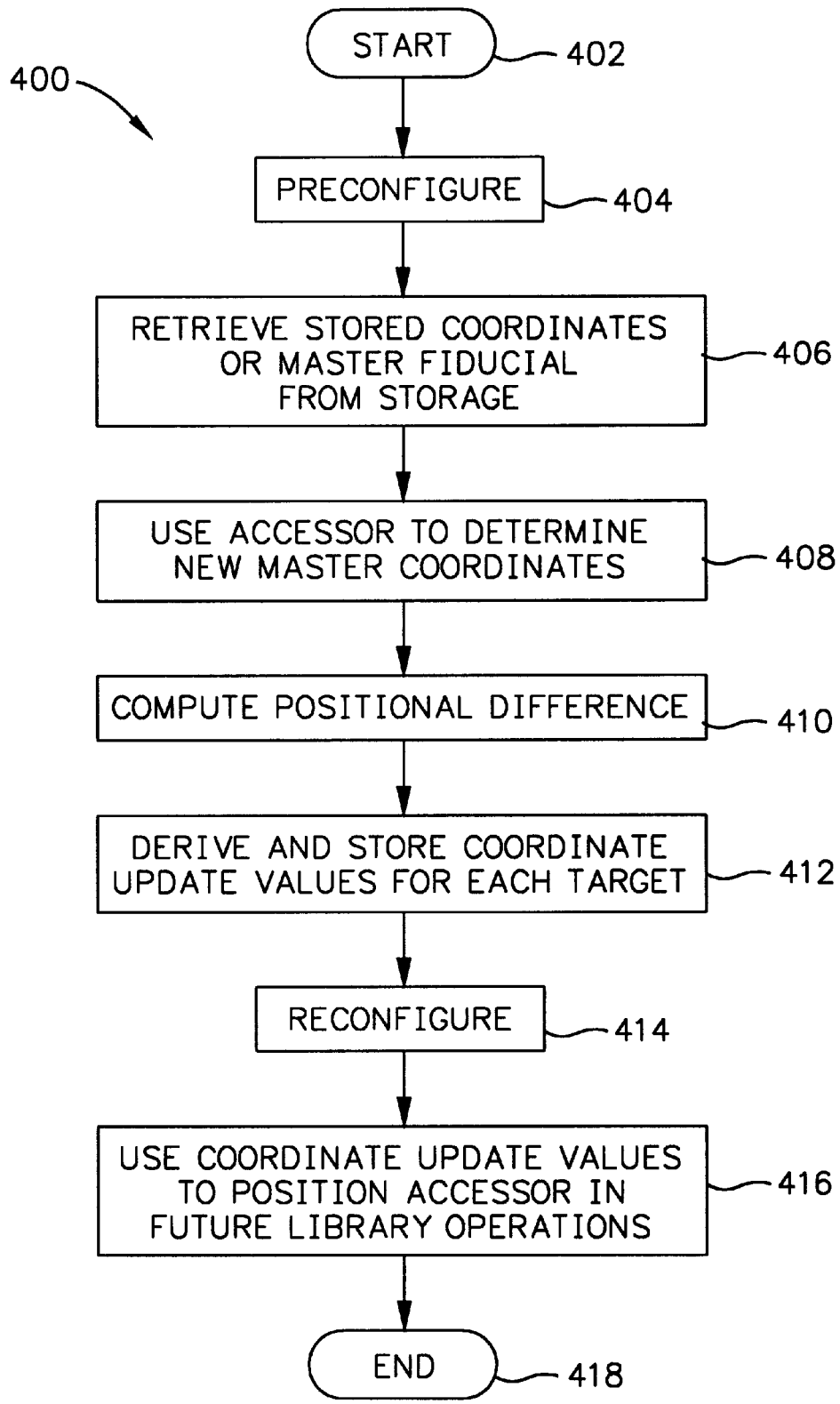
FIG. 4 is a flowchart of an operational sequence for recalibrating an accessor in a data storage library, in accordance with the invention.

FIG. 4 shows a sequence 400 to illustrate one example of the accessor recalibration method of the present invention. For ease of explanation, but without any limitation intended thereby, the example of FIG. 4 is described in the context of the data storage library 100 described above. The sequence 400 is initiated in step 402, when a customer engineer, host computer, or the library manager 118 initiates accessor recalibration.

Following step 402, the library manager 118 preconfigures the library 100 for recalibration of the accessor 116. If the library 100 also includes the optional second accessor 150, step 404 involves moving the accessor 116 into a garage, bay, or other area without any potential of collisions with the second accessor 150. During the subsequent recalibration process, the second accessor 150 will continue to satisfy user request for media access in the library 100.

Alternatively, if the library 100 is implemented with the accessor 116 alone, step 404 involves taking the library 100 "offline", or otherwise making the library unavailable for satisfying user requests.

After step 404, the library manager 118 retrieves the stored coordinates of the master fiducial 114 from the system file, contained in the storage unit 122. Then, in step 408 the library manager 118 directs the accessor 116 to determine the current coordinates of the master fiducial 114. Next, in step 410, the library manager 118 computes the positional difference between the current master coordinates and the stored coordinates. This yields, for example, $\Delta_x$ and $\Delta_y$ values.

With these positional differences computed, the library manager 118 in step 412 derives and stores "coordinate update values" for each target. In one embodiment, the coordinate update values may comprise updated x and y coordinates corresponding to each coordinate. These coordinates are stored in the database file in replacement of the previous coordinates in the "new teach" column; in this case, the "standard teach" columns are zeroed.

In another embodiment, the coordinate update values may comprise the computed positional differences themselves. In this case, the positional differences are stored in the database file in replacement of the previous $\Delta_x$ and $\Delta_y$ values in the "standard teach" column; in this case, the "new teach" columns are untouched.

After step 412, the library manager 118 reconfigures the library 100 for post-recalibration operation. In dual-accessor embodiments, step 414 involves simply bringing the accessor 116 online again, permitting it to move freely outside its garage/bay to satisfy customer jobs. In single-accessor embodiments, step 414 involves placing the library 100 "online" again, making the library available for satisfying user requests.

After step 414, the library manager 118 uses the new, updated contents of the database file in satisfying future customer media access requests. After step 416, the routine ends in step 418.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for recalibrating a first accessor in a data storage library, where each different alignment of the first accessor is characterized by a different coordinate, the library including multiple targets including fiducials, media storage cells, and one or more media drives, the library also including a storage unit containing a second accessor and a plurality of stored coordinates aligning the first accessor with the targets, the method comprising:

defining one of the fiducials as a master fiducial;

operating the first accessor to determine master coordinates defining the master fiducial;

locating the master fiducial to prevent the first and second accessors from colliding during the operation of the first accessor to determine master coordinates defining the master fiducial;

deriving a positional difference between the master coordinates and the stored coordinates of the master fiducial;

determining coordinate update values for each cell and drive according to the positional difference; and storing the coordinate update values in the storage unit for use to position the accessor during subsequent operation of the library.

2. The method of claim 1, further comprising:

suspending access of the media items during the operating, deriving, determining, and storing steps.

3. The method of claim 1, further comprising:

using the coordinate update values to position the first accessor during subsequent operation of the library.

4. The method of claim 1, the coordinate update values comprising new coordinates for each cell and drive.

5. The method of claim 4 further comprising:

for each target, storing its new coordinate in the storage unit in replacement of the stored coordinate for that target.

6. The method of claim 1, the coordinate update values comprising the positional difference.

7. The method of claim 1, further comprising:

determining coordinate update values for each non-master fiducial.

8. A signal-bearing medium tangibly embodying a program of machine-readable instructions executable by a digital processing apparatus to perform a method for recalibrating a first accessor in a data storage library, where each different alignment of the first accessor is characterized by a different coordinate, the library multiple targets including fiducials, media storage cells, and one or more media drives, the library also including a storage unit containing a plurality of stored coordinates aligning the accessor with the targets, the method comprising:

defining one of the fiducials as a master fiducial;

operating the first accessor to determine master coordinates defining the master fiducial;

locating the master fiducial to prevent the first and second accessors from colliding during said step of operating the first accessor to determine master coordinates defining the master fiducial;

deriving a positional difference between the master coordinates and the stored coordinates of the master fiducial;

determining coordinate update values for each cell and drive according to the positional difference; and storing the coordinate update values in the storage unit for use to position the first accessor during subsequent operation of the library.

9. The medium of claim 8, the method further comprising:

suspending access of the media items during the operating, deriving, determining, and storing steps.

10. The medium of claim 8, the method further comprising:

using the coordinate update values to position the first accessor during subsequent operation of the library.

11. The medium of claim 8, the coordinate update values comprising new coordinates for each cell and drive.

12. The medium of claim 11, the method further comprising:

for each target, storing its new coordinate in the storage unit in replacement of the stored coordinate for that target.

13. The medium of claim 8, the coordinate update values comprising the positional difference.

14. The medium of claim 8, the method further comprising:

determining coordinate update values for each non-master fiducial.

15. A data storage library, comprising:

multiple targets at predefined positions, including fiducials, media storage cells, and one or more media drives;

a first media accessor, each different alignment of which is characterized by a different coordinate;

a second media accessor;

a storage unit containing a plurality of stored coordinates aligning the first accessor with the targets;

a library manager coupled to the storage unit and the first accessor, the library manager being programmed to perform a method to recalibrate the first accessor, the method comprising:

defining one of the fiducials as a master fiducial;

operating the first accessor to determine master coordinates defining the master fiducial;

locating the master fiducial to prevent the first and second accessors from colliding during said step of operating the first accessor to determine master coordinates defining the master fiducial;

deriving a positional difference between the master coordinates and the stored coordinates of the master fiducial;

determining coordinate update values for each cell and drive according to the positional difference; and storing the coordinate update values in the storage unit for use to position the first accessor during subsequent operation of the library.

16. The apparatus of claim 15, the library manager being further programmed to perform steps comprising:

suspending access of the media items during the operating, deriving, determining, and storing steps.

17. The apparatus of claim 15, the library manager being further programmed to perform steps comprising:

using the coordinate update values to position the first accessor during subsequent operation of the library.

18. The apparatus of claim 15, the coordinate update values comprising new coordinates for each cell and drive.

19. The apparatus of claim 18, the library manager being further programmed to perform steps comprising:

for each target, storing its new coordinate in the storage unit in replacement of the stored coordinate for that target.

20. The apparatus of claim 15, the coordinate update values comprising the positional difference.

21. The apparatus of claim 15, the library manager being further programmed to perform steps comprising:

determining coordinate update values for each non-master fiducial.

* * * * *